H. BUSHNELL.
CHAIN BELT.
No. 169,955.                                          Patented Nov. 16, 1875.
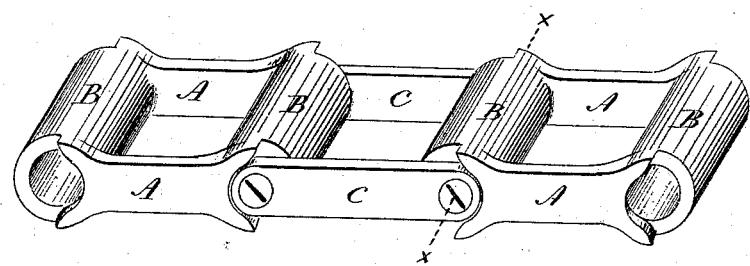
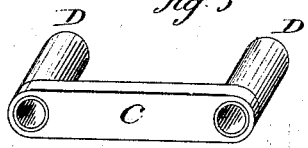
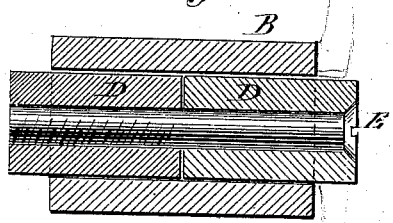
Witnesses
H. Shumway
Clara Broughton
Henry Bushnell, Inventor
By Atty's
Wm. F. Earle

UNITED STATES PATENT OFFICE.

HENRY BUSHNELL, OF NEW HAVEN, CONNECTICUT.

IMPROVEMENT IN CHAIN-BELTS.

Specification forming part of Letters Patent No. 169,955, dated November 16, 1875; application filed October 19, 1875.

*To all whom it may concern:*

Be it known that I, HENRY BUSHNELL, of New Haven, in the county of New Haven and State of Connecticut, have invented a new Improvement in Chain-Belt; and I do hereby declare the following, when taken in connection with the accompanying drawings and the letters of reference marked thereon, to be a full, clear, and exact description of the same, and which said drawings constitute part of this specification, and represent, in—

Figure 1, perspective view; Fig. 2, transverse section on line *x x*, enlarged; Fig. 3, part of connecting-links detached.

This invention relates to an improvement in that class of chain used upon what are known as "chain-wheels," commonly termed "chain-belt"—that is to say, chains which are worked by the teeth of a wheel, or, meshing into the teeth, serve to rotate the wheel; and the invention consists in constructing one link with tubular transverse bars, the next link, or sides of the link, with studs, to enter the said tubular bars, and form the connection from link to link, as more fully hereinafter described.

A A are the sides of the principal links connected by tubular bars B, the sides and the bars being cast in one and the same piece; C C, the sides of intermediate or connecting links, each constructed with a stud, D, at each end, as seen in Fig. 3, to enter the tubular bar, the studs being about one-half of the length of the tubular bar, and the sides C preferably in line with the sides A, by making an offset on the end of the tubular bars, as seen in Fig. 1. The bars C C are preferably secured together by passing a screw or bolt, E, through one to the other, as seen in Fig. 2, the side C and studs formed in one and the same piece of casting. By this construction the bars B are of convenient form for engaging with the teeth of the wheel, and the connections formed between the principal links by means of the studs D, formed on the sides C, are very much stronger than can be made by simply connecting the opposite sides C by a bolt through the bars without the studs, as in this case no strain whatever is brought upon the bolt—it simply secures them in position; and the chain is of very cheap construction, there being but little mechanical labor required in connecting the parts.

I claim—

The herein-described chain, consisting of the principal links, composed of two sides connected by parallel tubular bars, and intermediate links, composed of two sides, each with a stud at each end, corresponding to and inserted and secured in the tubular bars, substantially as described, so as to make connections between the principal links, substantially as specified.

HENRY BUSHNELL.

Witnesses:
JOHN E. EARLE,
CLARA BROUGHTON.